United States Patent
Baker et al.

(10) Patent No.: US 11,475,922 B2
(45) Date of Patent: Oct. 18, 2022

(54) STORAGE APPARATUS FOR SHUFFLING REMOVABLE STORAGE MEDIA

(71) Applicant: Quantum Corporation, San Jose, CA (US)

(72) Inventors: Jesse Baker, Sheridan, CO (US); William A. Yearsley, Centennial, CO (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 17/667,329

(22) Filed: Feb. 8, 2022

(65) Prior Publication Data
US 2022/0254380 A1 Aug. 11, 2022

Related U.S. Application Data

(60) Provisional application No. 63/147,533, filed on Feb. 9, 2021.

(51) Int. Cl.
*G11B 33/04* (2006.01)
*G11B 23/023* (2006.01)

(52) U.S. Cl.
CPC ........ *G11B 33/0461* (2013.01); *G11B 23/023* (2013.01)

(58) Field of Classification Search
CPC .......................... G11B 33/0461; G11B 23/023
See application file for complete search history.

(56) References Cited

U.S. PATENT DOCUMENTS

| | | | | |
|---|---|---|---|---|
| 5,402,285 A | * | 3/1995 | Theobald, Jr. | ........ G11B 33/121 |
| 5,532,888 A | * | 7/1996 | Acosta | ............... G11B 15/6835 360/92.1 |
| 5,598,949 A | * | 2/1997 | Perego | .................. G11B 23/113 221/290 |
| 5,659,440 A | * | 8/1997 | Acosta | ............... G11B 23/0236 294/169 |
| 2002/0057515 A1 | * | 5/2002 | Owens | ............... G11B 15/6885 360/92.1 |
| 2004/0179293 A1 | * | 9/2004 | Collins | .............. G11B 23/0236 360/92.1 |
| 2005/0078406 A1 | * | 4/2005 | Topham | .................. G11B 15/68 360/92.1 |

(Continued)

*Primary Examiner* — Brian E Miller
(74) *Attorney, Agent, or Firm* — Roeder & Broder LLP; James P. Broder

(57) ABSTRACT

The technology disclosed herein enables a gripper to shuffle items of removable storage media within a storage apparatus for those items. In a particular embodiment, an apparatus includes a housing for items of removable storage media. A top channel and a bottom channel are shaped to accept and store the items in respective single-file rows via an opening at one end of the rows. The apparatus also includes a shuffler for moving a first subset of the items, including ones of the items located in the bottom channel, towards the opening. When in a resting position, the shuffler includes a catch located at the opening and is connected to a rake at a closed side of the housing at an opposite end from the opening. The rake moves the first subset towards the opening when a gripper grips the catch and pulls outward from the opening. The shuffler returns to the resting position when the gripper releases the catch.

20 Claims, 14 Drawing Sheets

(56) References Cited

U.S. PATENT DOCUMENTS

| | | | |
|---|---|---|---|
| 2005/0275965 A1* | 12/2005 | Herring | G11B 23/107 360/92.1 |
| 2005/0286161 A1* | 12/2005 | Reasoner | G11B 17/225 360/92.1 |
| 2006/0146439 A1* | 7/2006 | McIntosh | G11B 15/6885 360/92.1 |
| 2013/0201810 A1* | 8/2013 | Takahashi | G11B 15/6835 369/75.11 |
| 2017/0084303 A1* | 3/2017 | Todd | G11B 17/225 |
| 2018/0144773 A1* | 5/2018 | Yamamoto | G11B 23/0035 |

* cited by examiner

STORAGE APPARATUS FOR SHUFFLING REMOVABLE STORAGE MEDIA

RELATED APPLICATIONS

This application is related to and claims priority to U.S. Provisional Patent Application 63/147,533, titled "A tape storage magazine that enables you to store tapes behind tapes and shuffle them within the magazine using a spring loaded rake," filed Feb. 9, 2021, and which is hereby incorporated by reference in its entirety.

TECHNICAL BACKGROUND

Removable storage media, such as magnetic tape cartridges, optical disk cartridges, and the like, are designed to be inserted into and removed from an access device, such as a magnetic tape drive, optical disk drive, etc. The access device accesses data (e.g., reads the data, writes the data, etc.) on an item of removable storage media currently inserted into the access device. When not in the access device, the item of removable storage media may be placed in any storage location. Libraries of removable storage media will often use robotic elements to automatically move items of removable storage media between access devices and storage slots for those items when not being accessed. Typically, the storage slots are only one item deep so as not to block other items in.

SUMMARY

The technology disclosed herein enables a gripper to shuffle items of removable storage media within a storage apparatus for those items. In a particular embodiment, an apparatus includes a housing, a shuffler and a gripper. The housing is configured to receive and retain for items of removable storage media. The housing includes an open first end, an opposed, closed second end, a top channel that is configured to receive and retain a first subset of the items of removable storage media, and a bottom channel that is configured to receive and retain a second subset of the items of removable storage media. The top channel and the bottom channel are shaped to receive and retain the items of removable storage media in respective single-file rows via the open first end. The a shuffler moves the second subset of the items of removable storage media toward the open first end. The shuffler includes a catch and a rake that is coupled to the catch. When the shuffler is in a resting position, the catch is located near the open first end and the rake is positioned near the closed second end. The rake moves the second subset of the items of removable storage media towards the open first end when the gripper grips the catch and pulls the catch outward away from the open first end. The shuffler returns to the resting position when the gripper releases the catch.

In some embodiments, the apparatus further includes a separator that inhibits the first subset of the items of removable storage media from falling onto the second subset of the items of removable storage media.

In some embodiments, a gap in the separator at the closed second end is large enough to allow a first item of the first subset of the items of removable storage media to fall into the bottom channel. In certain embodiments, a retaining catch may be located in the gap. When the shuffler has been moved away from the resting position, the retaining catch holds the first item in the top channel and, when the shuffler returns to the resting position, the retaining catch is released to allow the first item to fall into the bottom channel. Also, in some embodiments, when inserting a second item into the top channel for inclusion in the first subset of the items of removable storage media, the second item may push other items in the first subset of the items of removable storage media towards the closed second end, and then the first item falls into the bottom channel upon clearing the gap.

In some embodiments, the apparatus further includes a spring attached to the shuffler and the housing, wherein force from the spring returns the shuffler to the resting position when the catch is released.

In some embodiments, when the shuffler is in the resting position, the catch is positioned relative to a first item of the second subset of the items of removable storage media such that, when the gripper grips the first item, the gripper also grips the catch.

In some embodiments, the apparatus further includes at least one tab positioned within the bottom channel that allows the second subset of the items of removable storage media to move towards the open first end but not towards the closed second end.

In some embodiments, the gripper includes a robotic transport within an automated removable storage media library.

In some embodiments, the items of removable storage media include magnetic tape cartridges.

In another embodiment, a method is provided that includes receiving and retaining items of removable storage media within a housing, the housing including an open first end, an opposed, closed second end, a top channel that is configured to receive and retain a first subset of the items of removable storage media, and a bottom channel that is configured to receive and retain a second subset of the items of removable storage media, the top channel and the bottom channel being shaped to receive and retain the items of removable storage media in respective single-file rows via the open first end; positioning a shuffler at least partially within the housing, the shuffler including a catch and a rake that is coupled to the catch, wherein when the shuffler is in a resting position, the catch is located near the open first end and the rake is positioned near the closed second end; gripping the catch of the shuffler with a gripper; pulling the catch outward away from the open first end with the gripper such that the rake moves the second subset of the items of removable storage media towards the open first end; and releasing the catch from the gripper so that the shuffler returns to the resting position upon the catch being released.

In some embodiments, the housing further includes a separator that inhibits the first subset of the items of removable storage media from falling onto the second subset of the items of removable storage media. In certain embodiments, a gap may exist in the separator at the closed second end of the housing that is large enough for a first item of the first subset of the items of removable storage media to fall into the bottom channel. A retaining catch may be located in the gap. When the shuffler has been moved away from the resting position, the retaining catch holds the first item in the top channel and, when the shuffler returns to the resting position, the retaining catch is released to allow the first item to fall into the bottom channel. Also, in some embodiments, the method may include inserting a second item into the top channel for inclusion in the first subset of the items of removable storage media. The second item pushes other items in the first subset of the items of removable storage media towards the closed second end, and the first item falls into the bottom channel upon clearing the gap.

In some embodiments, a spring attached to the shuffler and the housing provides force to return the shuffler to the resting position upon the catch being released.

In some embodiments, when the shuffler is in the resting position, the method further includes gripping a first item of the second subset of the items of removable storage media with the gripper, the catch being positioned relative to the first item such that, when the first item is gripped by the gripper, the catch is also gripped by the gripper.

In some embodiments, the housing includes at least one tab positioned within the bottom channel that allows the second subset of the items of removable storage media to move towards the open first end but not towards the closed second end.

In some embodiments, the gripping, pulling, and releasing include the gripper including a robotic transport within an automated removable storage media library.

In some embodiments, the items of removable storage media include comprise magnetic tape cartridges.

DETAILED DESCRIPTION

The storage apparatuses described herein enable items of removable storage media to be stored more than one item deep. Moreover, a grabber configured to grab and move items that are stored only one deep (e.g., a robotic transfer within an automated media library) need not be redesigned in order to move an item stored behind one or more other items of removable storage media. The storage apparatus stores two rows of removable storage media items with one row on top of the other. Items in the bottom row are shuffled forward, which allows an item in the top row to drop into the bottom row at the back of the storage apparatus. Items in the top row are pushed towards the back when the grabber inserts another item into the top row. If that inserted item was just removed from the bottom row, then the grabber has shuffled a different item to the front of the bottom row. The grabber can then repeat the process of grabbing an item from the bottom row and placing the item in the top row until a targeted item (e.g., an item that is to be moved into an access device) reaches the front of the bottom row. That targeted item can then be moved by the grabber away from the storage apparatus despite the targeted item being stored behind other items in the storage apparatus.

Figure 1A:
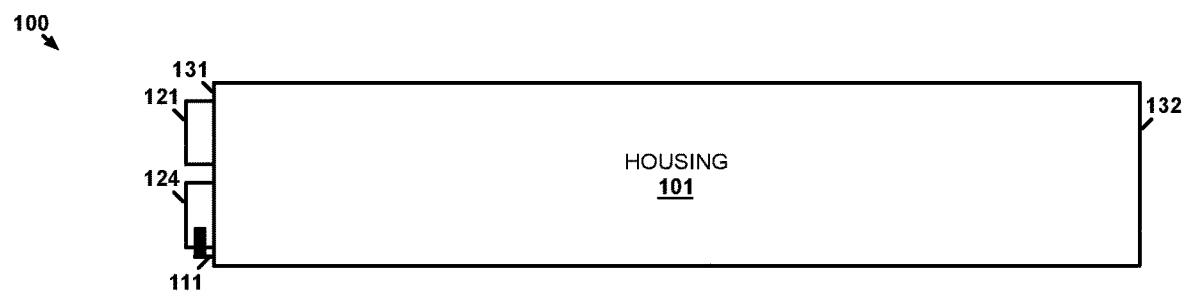
FIGS. 1A-1D illustrate a storage apparatus in which items of removable storage media can be shuffled.

FIG. 1A illustrates storage apparatus 100 in which items of removable storage media can be shuffled. Storage apparatus 100 includes housing 101 and shuffler 111. Housing 101 may be manufactured out of metal, plastic, composite, or some other type of manufacturing material—including combinations thereof. Shuffler 111 may be manufactured out of the same material(s) as housing 101 or the material(s) may differ. The housing includes an open first end 131 and an opposed, closed second end 132. It should be understood that closed second end 132 is called the closed second end because media items are not intended to be inserted/removed from closed second end 132 through an opening in housing 101. There may still be an opening of some kind in closed second end 132, although, that opening would not be one through which media items may pass during the operation described herein. While only shown in two dimensions, housing 101 is shaped as a substantially rectangular box to accept and store items of removable storage media therein. Items of removable storage media may include magnetic tape cartridges, optical disk cartridges, hot-swappable hard disk drives, or some other type of storage media designed to be readily inserted into and removed from an access device. Two such items of removable storage media, media item 121 and media item 124, are peeking out from open first end 131 in this example. In other examples, media item 121 and/or media item 124 may be flush with open first end 131 or not extending out from open first end 131 at all. Similarly, shuffler 111 may be flush with open first end 131 or not extend out from open first end 131 at all despite what is shown in this example. In some cases, storage apparatus 100 may be considered a storage magazine for items of removable storage media.

While housing 101 is a rectangular box in this example, it should be understood that housing 101 may be otherwise shaped as long as that shape still allows housing 101 to accept and store items of removable storage media while operating as described herein. In some cases, the external shape/dimensions of housing 101 may depend on an install position for housing 101. For instance, housing 101 may be installed in an automated removable storage media library along with other similar housings. Housing 101 may, therefore, be shaped to fit properly into a position in the library designed to accept such housings. Similarly, while the sides of housing 101 are shown as flat and featureless pieces of material, housing 101 may include seams, fasteners, holes, protrusion or some other type of visible feature.

Figure 1B:
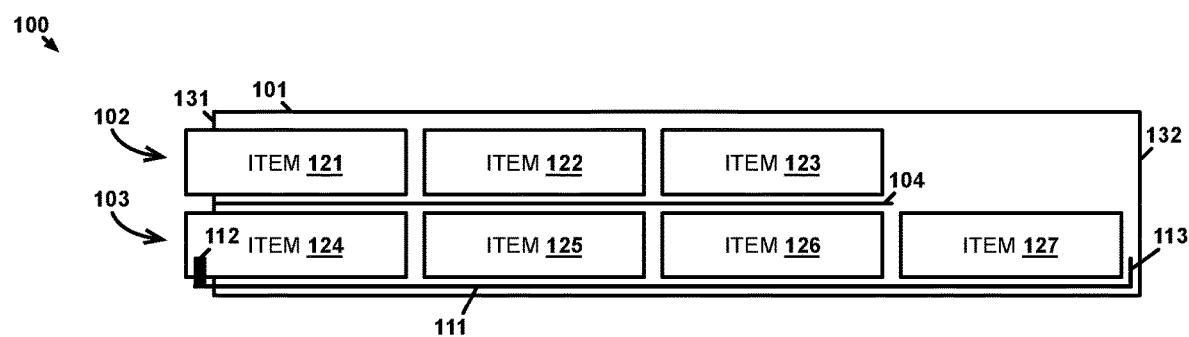

FIG. 1B illustrates storage apparatus 100 in which items of removable storage media can be shuffled. In FIG. 1B, the side of housing 101, which would otherwise be blocking a view inside of housing 101, is omitted to view an example of what may be contained inside housing 101. In this example, media items 121-123 are located in top channel 102 while media items 124-127 are located in bottom channel 103. While housing 101 is four media items deep in this example, other examples may be any number of two or more media items deep. Like is the case with housing 101, media items 121-127 are shown as rectangular boxes but, in practice, may be shaped differently and have different features (e.g., may not be perfectly rectangular, may include depressions and/or protrusions, may include access holes, etc.).

Separator 104 is a part of housing 101, or is otherwise attached to housing 101, to separate top channel 102 from bottom channel 103 so that media items in top channel 102 do not fall into bottom channel 103. Though shown above separator 104 for clarity, it should be understood that media items 121-123 will rest on separator 104 due to gravity when housing 101 is oriented with top channel 102 on top and bottom channel 103 on bottom. Separator 104 may be a continuous piece of material from open first end 131 towards closed second end 132, or may be a series of smaller pieces, such as tabs, that are spaced an appropriate distance apart so as media items 121-123 do not fall into bottom channel 103 and are still able to slide within top channel 102 as described herein. Likewise, while shown under media items 121-123, separator 104 may instead protrude into a channel in each side of media items 121-123 or a protrusion(s) from each side of media items 121-123 may insert into a channel in the sides of housing 101 that act as separator 104. Other manners of preventing items in top channel 102 from falling into bottom channel 103 may also be used. Separator 104 does not extend the entire length of housing 101. Rather, a gap exists between the end of separator 104 and closed second end 132 that is large enough for a media item to drop from top channel 102 into bottom channel 103. In this example, no media item is in top channel 102 over the gap so as to not fall through the gap onto media item 127.

In this example, shuffler 111 includes catch 112 and rake 113 that are coupled to one another at opposite ends of the shuffler 111. Catch 112 is located at or near first open end 131 so that a gripper can grip catch 112 at first open end 131 and pull shuffler 111 outward away from first open end 131 (i.e., to the left with respect to FIG. 1B). A gripper may be a mechanical device, such as a robotic transport in an automated removable media storage library, although, in some cases, the gripper may be a human hand for manual operation. Rake 113 is at the end of shuffler 111 that is at or near closed second end 132. While the portion of shuffler 111 between catch 112 and rake 113 is shaped/positioned so as not to interfere with movement of media items 124-127, rake 113 protrudes into bottom channel 103 so as to make contact with media item 127 when catch 112 is pulled outward from open second end 131. As such, when catch 112 is pulled outward from open second end 131, rake 113 also moves to the left towards open second end 131 and pushes media item 127 towards open second end 131 as well. Since media items 124-126 are between media item 127 and open second end 131, media item 127 pushes media items 124-126 towards open second end 131 as well. While shown with a gap between items, it should be understood that media items 124-127 abut one another to allow for the items to push one another (same for items 121-123). Although rake 113 contacts the back of media item 127 in this example, rake 113 may catch other places in other examples. For instance, rake 113 may protrude into a cavity on the underside of media item 127. Alternatively, rake 113 may protrude inward from the sides of housing 101 rather than up from the bottom, as currently shown. In those examples, shuffler 111 may route through housing 101 along the sides as well rather than under media items 124-127, as currently shown. Shuffler 111 is currently shown in a resting position and may be held in the resting position by a spring, elastic band/rope, or some other mechanism that holds shuffler 111 back towards closed second end 132.

Figure 1C:
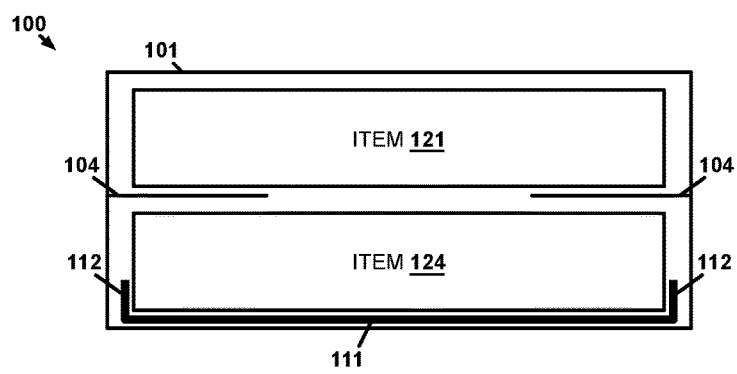

FIG. 1C illustrates storage apparatus 100 in which items of removable storage media can be shuffled. In this example, storage apparatus 100 is shown from the perspective looking directly at open first end 131. As such, media item 121 and media item 124 can be seen at open first end 131. Media item 121 is held up from falling onto media item 124 by separator 104. Separator 104 in this example is split into two separate lips protruding from the sides of housing 101 and extending back towards closed second end 132. In other examples, separator 104 may be a single piece stretching all the way across housing 101 to form a floor under media item 121 and the other media items in top channel 102.

In this example, the internal area of housing 101 is shaped such that top channel 102 and bottom channel 103 that substantially match the shape of the media items stored therein. By maintaining a snug fit, items in single file within the channels can push each other along the channel towards open first end 131 and away from open first end 131 while keeping movement in other directions to a minimum. In some examples, guides may be installed within housing 101 to maintain proper orientation of the media items within each channel. Though not shown, housing 101 may also include a guide channel, or some other type of guide, to ensure shuffler 111 only moves predominantly in an inward and outward direction (i.e., to the left and right in FIG. 1B). In some examples, one or more tabs may be positioned inside of housing 101 that enable media items to move one way and not the other. In this case, media items in top channel 102 would be allowed to move towards closed second end 132 and media items in bottom channel 103 would be allowed to move towards open first end 131.

Catch 112 extends upward from the remainder of shuffler 111 on the sides of media item 124. Preferably, catch 112 is positioned relative to media item 124 such that a gripper configured to grip the sides of media item 124 will also grip catch 112. The gripper in those examples does not require modification to grip catch 112. While catch 112 is shown on each side of media item 124, a catch on only one side of media item 124 may suffice in some examples. In other examples, a gripper may grip media item 124 from the top and bottom rather than the sides. In those examples, catch 112 may be positioned under media item 124 so that the gripper grips catch 112 when engaging the bottom side of media item 124.

Figure 1D:
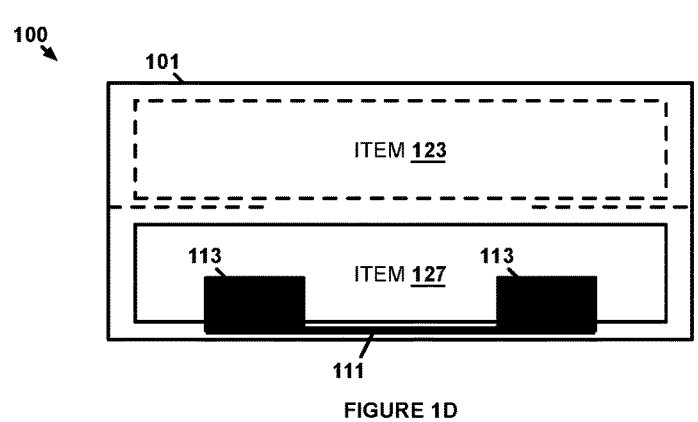

FIG. 1D illustrates storage apparatus 100 in which items of removable storage media can be shuffled. In this example, storage apparatus 100 is shown from the perspective looking directly at closed second end 132 with any material blocking the view of the inside of housing 101 removed. Media item 123 and separator 104 are shown as dashed lines because, as shown in FIG. 1B, separator 104 does not extend all the way to closed second end 132 and media item 123 is not positioned above media item 127 at the back of housing 101. Rake 113 includes two tabs that protrude upwards from shuffler 111. This arrangement of rake 113 is merely an example showing that rake 113 will catch media item 127 if shuffler 111 is moved towards open first end 131. In other examples, rake 113 may be a single element, more than two elements, may have a different shape, may approach media item 127 from the sides rather than the bottom, or may take some other form that still enables rake 113 to catch and push media item 127.

Figure 2:
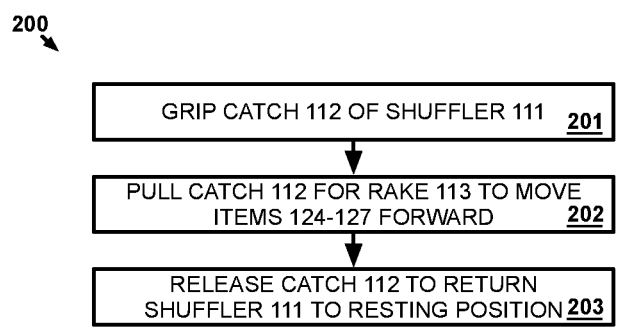
FIG. 2 illustrates an operation for shuffling items of removable storage media in a storage apparatus.

FIG. 2 illustrates operation 200 for shuffling items of removable storage media in a storage apparatus. In operation 200, a gripper grips catch 112 of shuffler 111 (201). The gripper may be a mechanical device (e.g., one controlled by a computing system like computing architecture 700) or may be a human user's hand. In these examples, bottom channel 103 is at capacity, so gripping catch 112 may also grip media item 124. In other examples, the spot in which media item 124 occupies may be empty (e.g., during initial loading of media items into storage apparatus 100) so only catch 112 may be gripped. The gripper pulls catch 112 outwards away from open first end 131 (i.e., to the left, as illustrated in FIG. 1B) to move shuffler 111 (201). Rake 113, being a part of shuffler 111, is propelled by shuffler 111 to move media items 124-127 towards open first end 131. A catch, or other type of movement limiter, within housing 101 may prevent shuffler 111 from moving more than necessary to move media item 125 into media item 124's previous position at open first end 131, media item 126 into media item 125's previous position, and media item 127 into media item 126's previous position. As such, shuffler 111 may only move a distance of the length of one media item from its resting position. The gripper releases catch 112 and shuffler 111 returns to its resting position (203). One or more springs, elastic bands/ropes, or some other object that stores mechanical energy when shuffler 111 is moved outward may then expend that energy to pull shuffler 111 back to its resting position.

Once operation 200 is complete, media item 124 is no longer located within storage apparatus 100 and all remaining media items in bottom channel 103 have shifted by one position. Media item 125 has, therefore, been shuffled to the front of housing 101 where media item 125 can be grabbed by the gripper instead of being stuck behind media item 124.

Figure 3A:
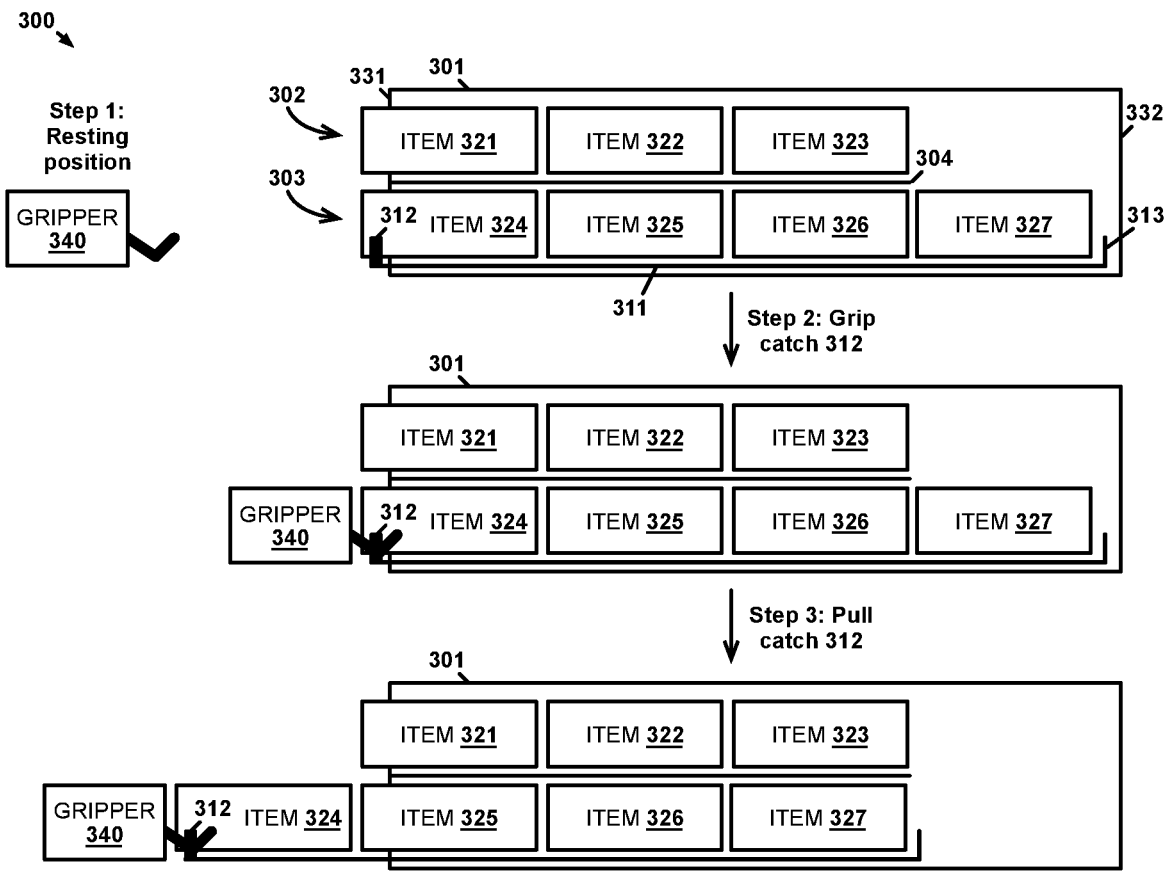
FIGS. 3A-3C illustrate an operational scenario for shuffling items of removable storage media in a storage apparatus.

FIG. 3A illustrates operational scenario 300 for shuffling items of removable storage media in a storage apparatus. Operational scenario 300 includes an example of storage apparatus 100, which includes housing 301, separator 304, and shuffler 311. Shuffler 311 includes catch 312 and rake 313. Top channel 302 of housing 301 is currently storing media items 321-323 and bottom channel 303 of housing 301 is currently storing media items 324-327. Gripper 340 is a mechanism that is controlled via motors, belts, actuators, electronic control circuitry, or some other type of component, including combinations thereof, to shuffle media items within housing 301. Gripper 340 may also be capable of moving a media item removed from housing 301 and placing the media item into an access device.

In operational scenario 300, shuffler 311 is at resting position in step 1 because it is not being acted upon by an outside force, such as gripper 340. Gripper 340 may simply be waiting for something to do or may be performing some other task (e.g., moving media items other than those stored in housing 301). At step 2, gripper 340 moves into position in front of media item 324 and grips catch 312. Once catch 312 is gripped, gripper 340 pulls catch 312 outwards from open first end 331 at step 3. Catch 312 pulls out a distance equal to a distance necessary to move media item 325 into media item 324's vacated position when rake 313 pushes on media item 327. With media items 325-327 now all moved over one position within bottom channel 303, media item 324 has been removed from within housing 301.

Figure 3B:
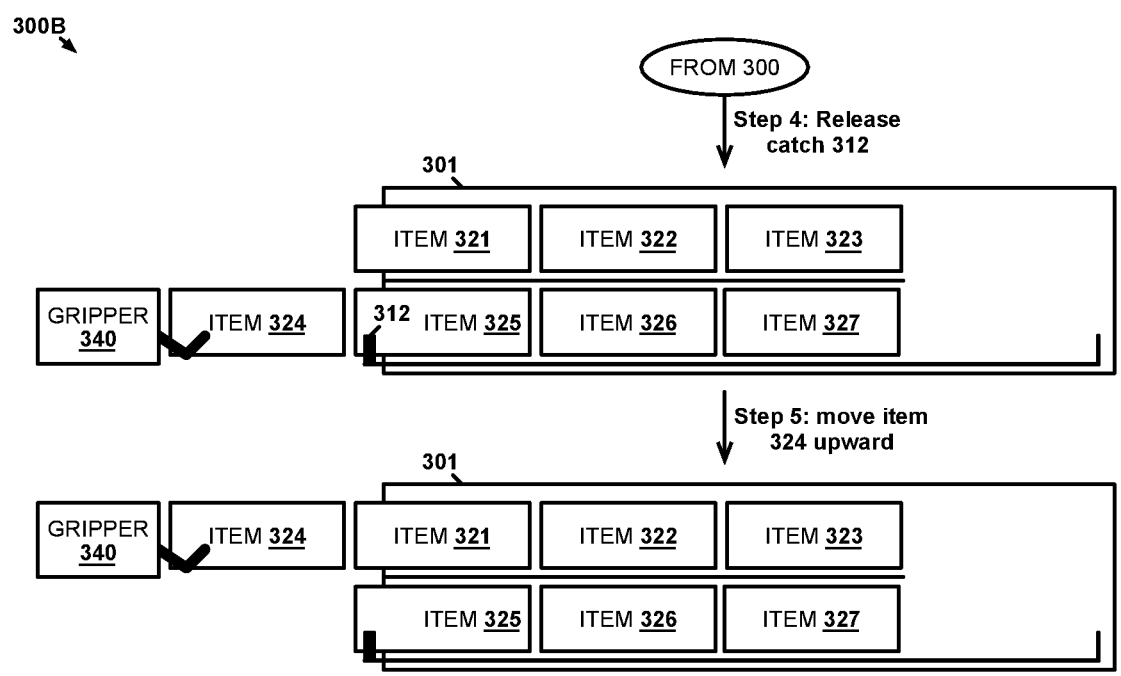

FIG. 3B illustrates operational scenario 300B for shuffling items of removable storage media in a storage apparatus. Operational scenario 300B is a continuation of operational scenario 300. In operational scenario 300B, gripper 340 releases catch 312 at step 4, which allows shuffler 311 to be pulled back to its resting position within housing 301. Though not shown, gripper 340 may include a shelf, secondary grippers, or some other component that enables gripper 340 to release catch 312 without dropping media item 324. Shuffler 311 may be pulled back into housing 301 by a spring or other component that stores mechanical energy. For example, one end of a coil spring may be attached to shuffler 311 while the other end is attached to housing 301. When gripper 340 pulled catch 312 outward from housing 301, the spring compresses or extends (depending on the type of spring and how it is attached) to store energy. When catch 312 is released, that stored energy is also released to pull shuffler 311 back to its resting position. In other examples, gripper 340 may push shuffler 311 back to the resting position. In either case, housing 301 does not include a powered element, such as a motor within housing 301, to bring shuffler 311 back to the resting position.

In this example, gripper 340 is being controlled to shuffle media items 321-327 so that a certain one of media items 321-327 other than media item 321 and media item 324 is positioned at the open first end. That certain media item can then be extracted from housing 301 and moved to another position in the library (e.g., to an access device). As such, gripper 340 moves media item 324 upward at step 5 to be in line with top channel 302 for placement back into housing 301 within top channel 302.

Figure 3C:
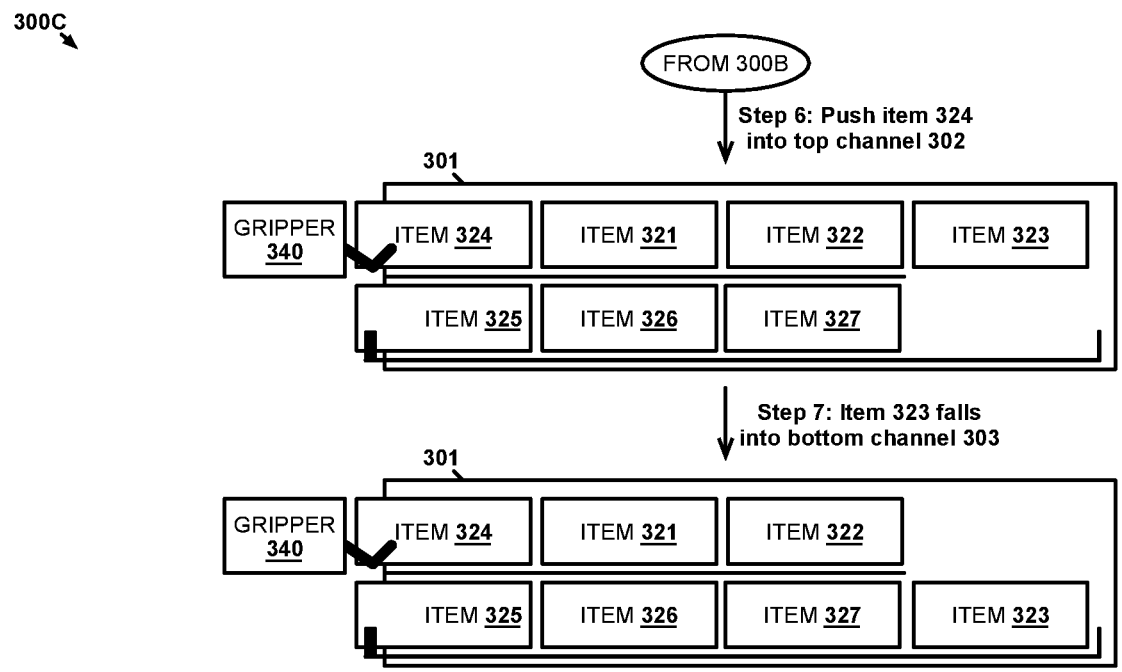

FIG. 3C illustrates operational scenario 300C for shuffling items of removable storage media in a storage apparatus. Operational scenario 300C is a continuation of operational scenario 300. Once gripper 340 has aligned media item 324 with top channel 302, gripper 340 pushes media item 324 at step 6 into top channel 302. Pushing media item 324 into top channel 302 causes media item 324 to push media items 321-323 deeper into top channel 302 towards closed second end 332. Pushing media item 324 all the way into top channel 302 causes media item 323 to be fully over the gap in separator 304. Since the gap is large enough to for media item 323 to pass, media item 323 falls into bottom channel 303 at step 7. Specifically, media item 323 falls into a space in bottom channel 303 that was created when media item 327 was moved by rake 313 in step 3. At the end of operational scenario 300, top channel 302 and bottom channel 303 both contain the same number of media items, but those media items are in a different order than they were at the onset of operational scenario 300.

If media item 325 is the media item targeted by gripper 340, then gripper 340 can now perform steps 2-4 again to move media item 325 out of housing 301 (e.g., into an access device). However, if another media item is the targeted item, then gripper 340 may repeat steps 2-7 until the targeted item is accessible. For instance, if media item 326 is the targeted item, then steps 2-7 would repeat just one more time to bring media item 326 to the front of bottom channel 303. In some examples, a control system (e.g., computing architecture 700 described below) for gripper 340 may track positions of media items 321-327 within housing 301 to recognize how many iterations of steps 2-7 need be performed until the targeted media item is accessible. Moreover, for the storage apparatus to work properly, media items can only be added into top channel 302 but can be removed from open first end 331 in either top channel 302 or bottom channel 303. Removing a media item from top channel 302 results in an open space at open first end 331 in top channel 302. That media item could, therefore, simply be placed back into the empty space left in top channel 302 or a new media item can take its place.

When initially loading media items into housing 301, media items are added one by one by gripper 340 to top channel 302 until the fourth item is loaded. At that point, the first item added to top channel 302 will have reached separator 304 and dropped into top channel 302. Gripper 340 then pulls catch 312 before adding each subsequent item to top channel 302 to create space in bottom channel 303 into which a next media item can drop from top channel 302 to bottom channel 303.

In some examples, separator 304 may include a retaining catch in the gap that enables a fourth media item to be stored in top channel 302. The retaining catch keeps a media item from falling into bottom channel 303. When shuffler 311 moves the items in bottom channel 303 forwards to open a space in bottom channel 303, shuffler 311 returning to the resting position triggers the retaining catch to release the media item to fall through the gap down to bottom channel 303. Once the media item has fallen through the gap, the retaining catch returns to its original position. As such, when another media item is inserted into top channel 302, the media item that is pushed over the gap in separator 304 is held up by the retaining catch.

Advantageously, despite seven media items fitting into housing 301, open first end 331, which faces gripper 340 (e.g., faces an aisle in which gripper 340 moves within a library), uses the same amount of two-dimensional space as two single media item slots would (e.g., one slot would hold media item 321 and the other would hold media item 324 but none of the other media items would be located behind them). Gripper 340 also does not require more space than is necessary to remove one media item from housing 301 in order to shuffle media items within housing 301. As such, if gripper 340 moves within an aisle of an automated removable storage media library, the aisle does not need to be widened to accommodate access to media items stored behind those at open first end 331. Also, since the media item at open first end 331 in top channel 302 can be removed and then replaced back where it was taken (e.g., after accessing the media item), media items that are accessed more frequently may be stored in that position. Media items that require shuffling to remove from housing 301 may be items that are less often accessed.

Figure 4A:
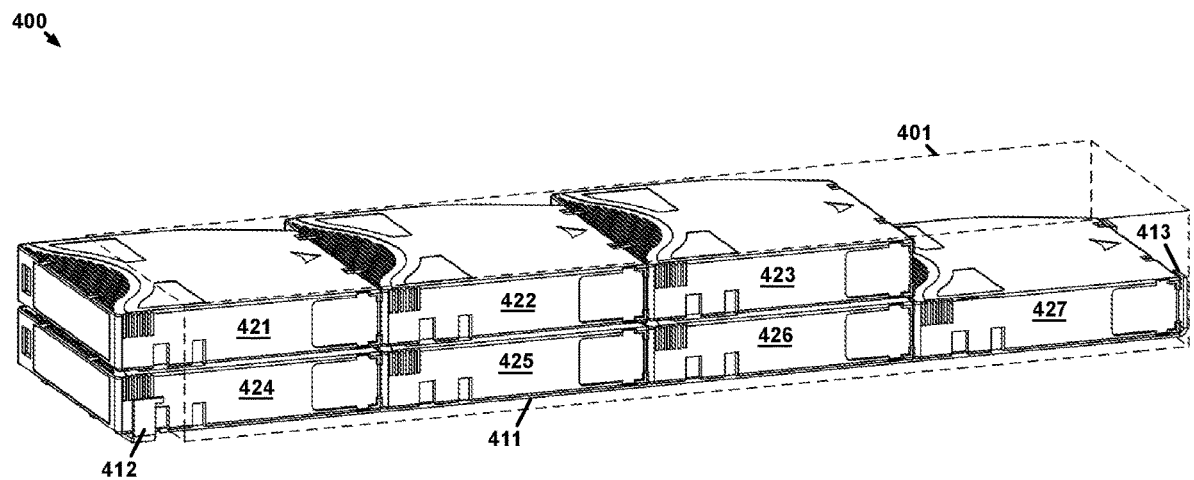
FIGS. 4A-4C illustrate a storage apparatus in which items of removable storage media can be shuffled.

FIG. 4A illustrates storage apparatus 400 in which items of removable storage media can be shuffled. Storage apparatus 400 is an example where storage apparatus 100 is a magazine for storing magnetic tape cartridges. In this example, housing 401 of storage apparatus 400 is transparent to show tape cartridges 421-427 housed therein, although, a different number of tape cartridges may be accommodated by housing 401 in other examples. Tape cartridges 421-423 are located in a top channel while tape cartridges 424-427 are located in a bottom channel. Shuffler 411 is also shown under tape cartridges 424-427. When in its resting position, catch 412 of shuffler 411 is positioned next to a depression in tape cartridge 424 that is used to grab tape cartridge 424. Each of the other tapes include the same depression, as shown. Rake 413 of shuffler 411 protrudes into the bottom channel between tape cartridge 427 and a closed second end of housing 401.

Figure 4B:
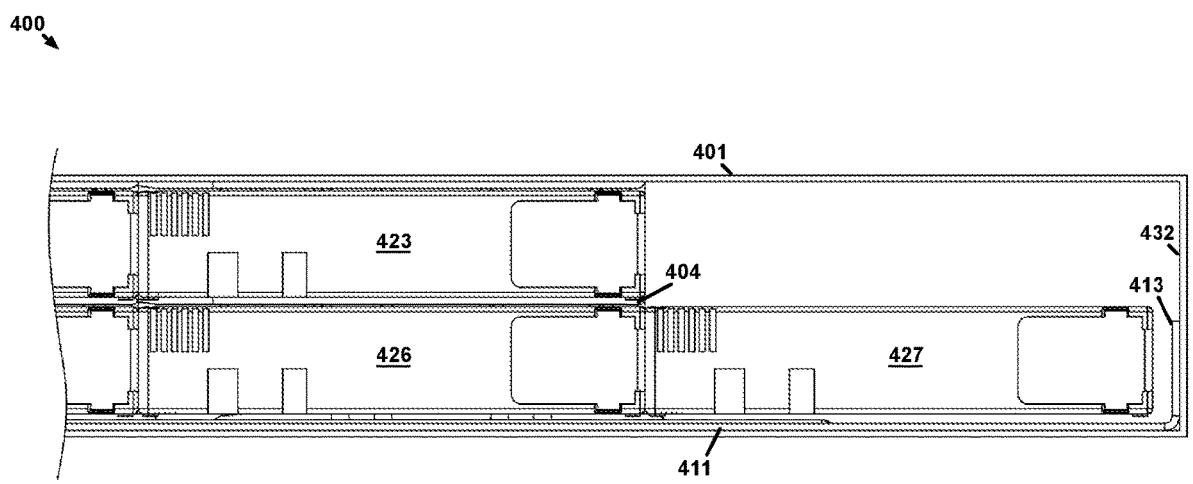

FIG. 4B illustrates storage apparatus 400 in which items of removable storage media can be shuffled. In this example, the end of storage apparatus 400 towards closed second end 432 is shown from a side perspective with the side of housing 401 removed for visibility. From this angle, shuffler 411 can be seen running between tape cartridges 424-427 and a bottom side of housing 401. Similarly, rake 413 can be seen protruding upward from shuffler 411 into the bottom channel to rest between tape cartridge 427 and closed second end 432. Also, separator 404 can be seen separating tape cartridges 421-423 in the top channel and tape cartridges 424-427 in the bottom channel. Separator 404 ends before extending over tape cartridge 427 to allow a tape cartridge to drop into the bottom channel, as described above.

Figure 4C:
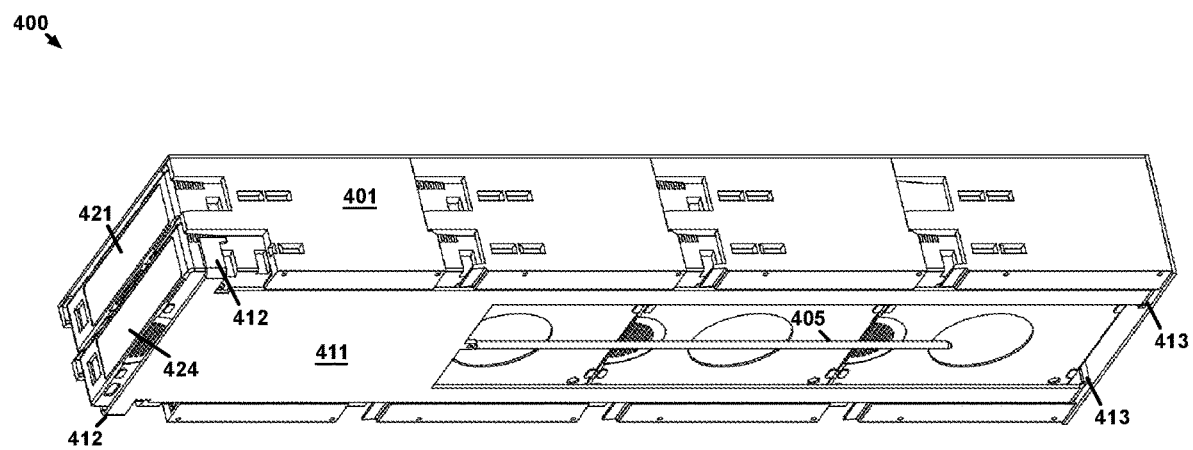

FIG. 4C illustrates storage apparatus 400 in which items of removable storage media can be shuffled. In this example, storage apparatus 400 is viewed at an angle that shows the underside of storage apparatus 400 with a bottom side omitted from housing 401. This angle shows the two tabs that make up catch 412 are bent upwards from shuffler 411 along the side of tape cartridge 424. Shuffler 411 splits into two rails that extend back through housing 401 and end at closed second end 432 with two tabs that make up rake 413. Spring 405 is connected to shuffler 411 where shuffler 411 splits into the two rails. While the other end of spring 405 is not shown connected to anything, that end of spring 405 is connected to the bottom side of housing 401 when present. Since shuffler 411 moves outward from housing 401 when pulled, spring 405 stores energy due to one end being connected to housing 401, which does not move. When shuffler 411 is released, the energy stored in spring 405 moves shuffler 411 back to resting position.

Figure 5:
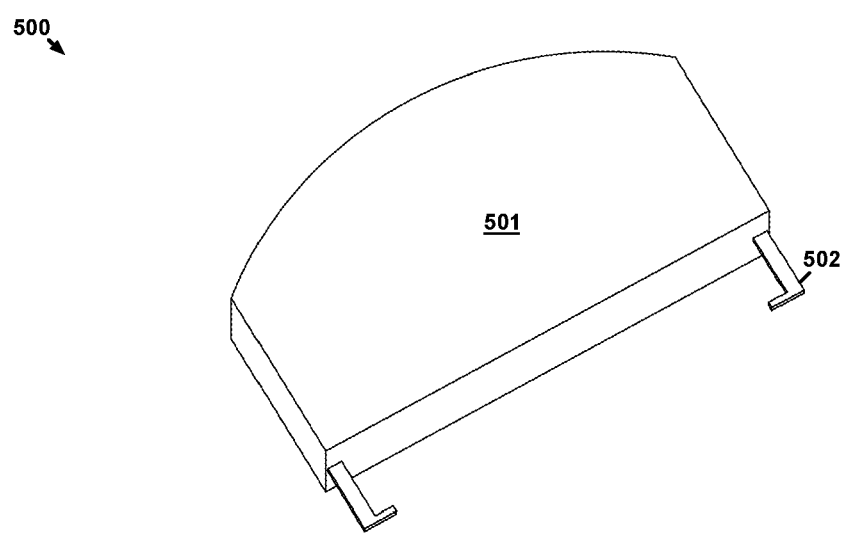
FIG. 5 illustrates a robotic transport for shuffling items of removable storage media in a storage apparatus.

FIG. 5 illustrates robotic transport 500 for shuffling items of removable storage media in a storage apparatus. Robotic transport 500 includes body 501 and claw 502. Body 501 may enclose one or more mechanisms (e.g., actuators, motors, etc.) to move claw 502 to grip and release tape cartridges and/or catch 412. Electronic circuitry may also be included in body 501 to control the operation of robotic transport 500. Although not shown, robotic transport 500 may be connected to various other robotic components of an automated tape library to move robotic transport 500 within the library. For example, may be moved to align with a tape cartridge in storage apparatus 400. That tape cartridge may be shuffled within storage apparatus 400 using movement of robotic transport 500 (e.g., to pull the tape cartridge out of the bottom channel along with catch 412 and replaced in the top channel) or robotic transport 500 may move the tape to another area within the library, such as a magnetic tape drive to access data on the tape cartridge.

Figure 6A:
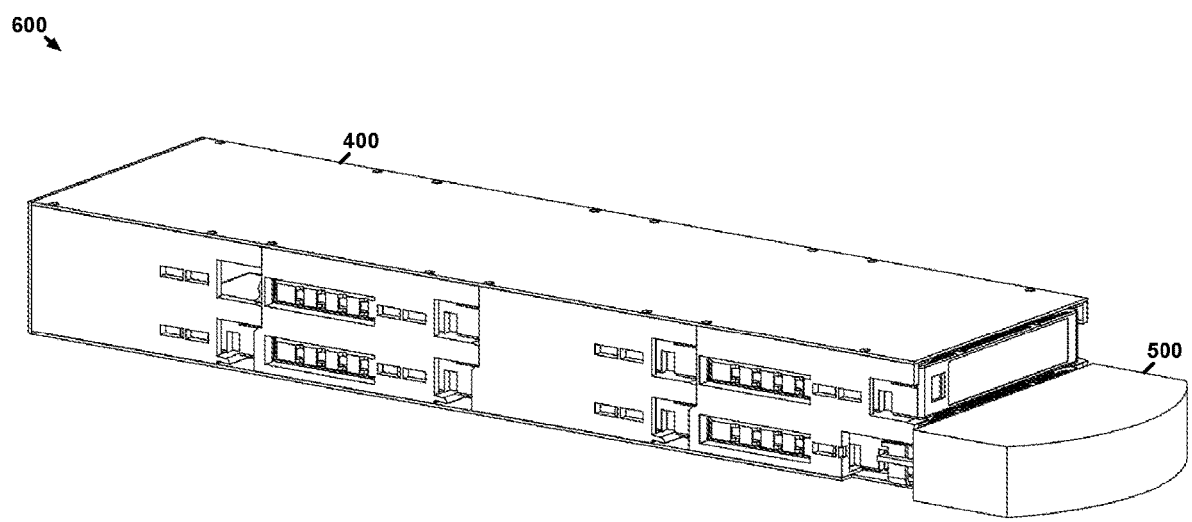
FIGS. 6A-6B illustrate an operational scenario for shuffling items of removable storage media in a storage apparatus.
Figure 6B:
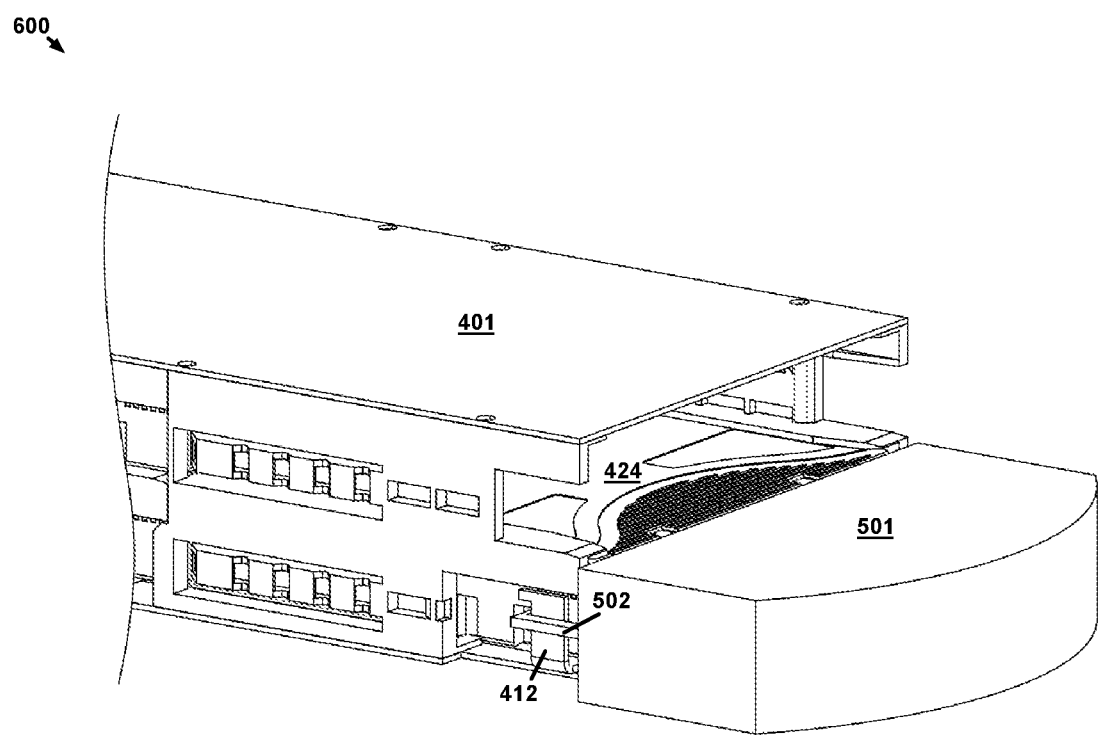

FIG. 6A illustrates operational scenario 600 for shuffling items of removable storage media in a storage apparatus. In operational scenario 600, robotic transport 500 is positioned to remove a tape cartridge from the bottom channel of storage apparatus 400. FIG. 6B also illustrates operational scenario 600 but zoomed in on the opening of storage apparatus 400 where robotic transport 500 is located. Tape cartridge 421 is also omitted to better show tape cartridge 424. Due to the positioning of catch 412 relative to an indent in tape cartridge 424 that robotic transport 500 is configured to grip via claw 502, robotic transport 500 also grips catch 412 when moving to grip tape cartridge 424. Robotic transport 500 will then pull on catch 412 when attempting to pull tape cartridge 424 out from housing 401. In some examples, tape cartridge 424 itself may not end up being gripped by claw 502 (e.g., the dimensions of claw 502 may not allow for tape cartridge 424 to be gripped with catch 412 in the way). Instead, tape cartridge 424 is removed from housing 401 when rake 413 pushes tape cartridges 424-427 due to catch 412 being pulled out by robotic transport 500.

Figure 7:
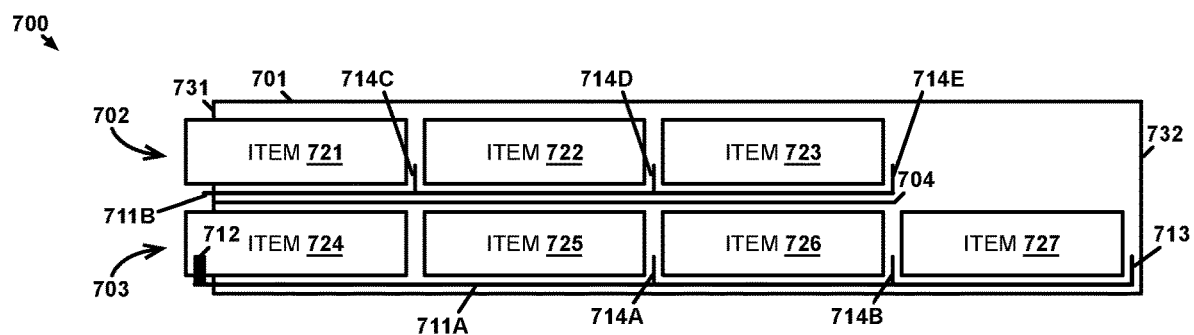
FIG. 7 illustrates a storage apparatus in which items of removable storage media can be shuffled

FIG. 7 illustrates storage apparatus 700 in which items of removable storage media can be shuffled. Storage apparatus 700 is similar to storage apparatus 100. Storage apparatus 700 includes housing 701, having open first end 731 and closed second end 732, and shuffler 711. A side of housing 701 is omitted in this example to show the inner workings of storage apparatus 700. In this example, storage apparatus 700 is currently storing media items 721-727 with media items 721-723 in top channel 702 and media items 724-727 in bottom channel 703. Separator 704 separates top channel 702 from bottom channel 703. In storage apparatus 700, shuffler 711 includes two components, bottom shuffler 711A and top shuffler 711B. Bottom shuffler 711A is similar to the shufflers described above and includes catch 712 and rake 713. However, in this example, bottom shuffler 711A includes collapsible rakes 714A-B spaced between media items to assist with the shuffling process when, housing 701 is not completely full (e.g., when there is a gap of one or more of media items 721-727 not presently stored in storage apparatus 700). For example, if media item 727 was not present, then media item 726 could not be pushed by media item 727 when catch 712 is pulled outward from open first end 731 (i.e., to the left as shown) in a manner similar to step 3 from operational scenario 300. Collapsible rakes 714A-B, as their name implies, are collapsible so that they can move under media items in bottom channel 703 when shuffler 711 returns to its resting position. Specifically, collapsible rakes 714A-B may each hinge from at the bottom so that they collapse down towards the left, rather than catching on a media item, when bottom shuffler 711A is moving to the right to return to the resting position. If no media item is present in a position, the corresponding collapsible rake for that position may remain erect. Collapsible rakes 714A-B may be spring loaded (or use some other mechanism) so as to pop back up when not passing under a media item. Collapsible rakes 714A-B do not collapse in the other direction (i.e., down and towards the right). Thus, when catch 712 is pulled to the left, collapsible rakes 714A-B with both catch on any media item(s) that may be present and pull the media items to the left as well. For instance, if only media item 726 was located in bottom channel 703, collapsible rake 714B would push media item 726 to the left into the spot where media item 725 is shown to be located. Then, when bottom shuffler 711A returns to its resting position, collapsible rake 714A will collapse to travel under media item 726 before returning to its erect position on the right side of media item 726.

In this example, top channel 702 includes a second component of shuffler 711, top shuffler 711B. Though not shown, a mechanical link connects top shuffler 711B with bottom shuffler 711A so that top shuffler 711B moves along with bottom shuffler 711A. For example, a connecting bar may run up the side of housing 701 that is omitted or catch 712 may extend up to top shuffler 711B. Top shuffler 711B includes collapsible rakes 714C-E positioned between media items and at the end of top shuffler 711B. Collapsible rakes 714C-E collapse in the opposite direction as collapsible rakes 714A-B (i.e., down and towards the right). As such, when catch 712 is pulled outwards, collapsible rakes 714C-E collapse and slide under whatever media items are present in top channel 702 (or remain erect should no media item be present in a slot to push the collapsible rake down). When catch 712 is released, top shuffler 711B moves rightward to its resting position (i.e., the position shown in storage apparatus 700). Collapsible rakes 714C-E catch on any media items in top channel 702 and move them to the right as well. For example, when catch 712 is pulled outward, collapsible rake 714C collapses to move under media item 721. Upon reaching the other side of media item 721, collapsible rake 714C returns to its erect position and catches on media item 721 when catch 712 is released. As top shuffler 711B returns to its resting position, collapsible rake 714B moves media item 721 into the position of media item 722.

The use of collapsible rakes 714A-E enables media items to be moved through storage apparatus 700 without requiring all seven media item positions be filled. Instead of requiring one media item to push on another media item (i.e., when inserted into top channel 702 or pushed by rake 713), collapsible rakes 714A-E push the media items along top channel 702 and bottom channel 703. As such, even a single media item can be cycled through all positions within housing 701 by a gripper repeatedly pulling and releasing catch 712 without having to add more media items to storage apparatus 700.

Figure 8:
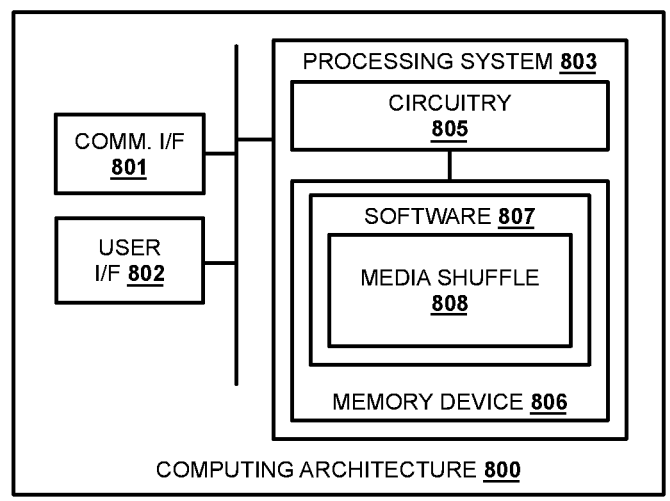
FIG. 8 illustrates a computing architecture for shuffling items of removable storage media in a storage apparatus.

FIG. 8 illustrates computing architecture 800 for shuffling items of removable storage media in a storage apparatus. Computing architecture 800 is an example computing architecture for controlling a gripper, such as gripper 340 or robotic transport 500, to operate as described herein to shuffle items of removable storage media in a storage apparatus. Computing architecture 800 may be incorporated into the gripper or may be in communication with the gripper and/or other elements controlling the gripper, such as drive motors, actuators, etc., via communication links therewith. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a tangible computer readable storage medium, such as a disk drive, flash drive, data storage circuitry, or some other memory apparatus. In no examples would a computer readable storage medium of memory device 806, or any other computer readable storage medium herein, be considered a transitory form of signal transmission (often referred to as "signals per se"), such as a propagating electrical or electromagnetic signal or carrier wave. Operating software 807 comprises computer programs, firmware, or some other form of machine-readable processing instructions. Operating software 807 includes media shuffle module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, media shuffle module 808 directs processing system 803 to grip, via a gripper, a catch of a shuffler for moving a first subset of items of removable storage media that are in a housing. The housing includes a top channel and a bottom channel that are shaped to accept and store the items in respective single-file rows via an open first end. The first subset includes ones of the items that are located in the bottom channel and, when in a resting position, the shuffler includes the catch located at the open first end and a rake located at a closed second end of the housing at an opposite end from the open first end. The media shuffle module 808 directs processing system 803 to pull, via the gripper, the catch outward from the open first end to move the shuffler, which propels the rake to move the first subset towards the open first end. The media shuffle module 808 also directs processing system 803 to release the catch via the gripper, wherein the shuffler returns to the resting position upon the catch being released.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. An apparatus comprising:
   a housing that is configured to receive and retain a plurality of removable storage media, the housing including an open first end, an opposed, closed second end, a top channel that is configured to receive and retain a first subset of the plurality of removable storage media, and a bottom channel that is configured to receive and retain a second subset of the plurality of removable storage media, the top channel and the bottom channel being shaped to receive and retain the plurality of removable storage media in respective single-file rows via the open first end;
   a shuffler for moving the second subset of the plurality of removable storage media toward the open first end, the shuffler including a catch and a rake that is coupled to the catch; and
   a gripper;
   wherein when the shuffler is in a resting position, the catch is located near the open first end and the rake is positioned near the closed second end;
   wherein the rake moves the second subset of the plurality of removable storage media towards the open first end when the gripper grips the catch and pulls the catch outward away from the open first end; and
   wherein the shuffler returns to the resting position when the gripper releases the catch.

2. The apparatus of claim 1, further comprising:
   a separator that inhibits the first subset of the plurality of removable storage media from falling onto the second subset of the plurality of removable storage media.

3. The apparatus of claim 2, wherein a gap in the separator at the closed second end is large enough to allow a first removable storage medium of the first subset of the plurality of removable storage media to fall into the bottom channel.

4. The apparatus of claim 3, further comprising:
   a retaining catch located in the gap, wherein when the shuffler has been moved away from the resting position, the retaining catch holds the first removable storage medium in the top channel, and wherein, when the shuffler returns to the resting position, the retaining catch is released to allow the first removable storage medium to fall into the bottom channel.

5. The apparatus of claim 3, wherein, when inserting a second removable storage medium into the top channel for inclusion in the first subset of the plurality of removable storage media, the second removable storage medium pushes other items removable storage media in the first subset of the plurality of removable storage media towards the closed second end, and wherein the first removable storage medium falls into the bottom channel upon clearing the gap.

6. The apparatus of claim 1, further comprising:
   a spring attached to the shuffler and the housing, wherein force from the spring returns the shuffler to the resting position when the catch is released.

7. The apparatus of claim 1, wherein when the shuffler is in the resting position, the catch is positioned relative to a first removable storage medium of the second subset of the plurality of removable storage media such that, when the gripper grips the first removable storage medium, the gripper also grips the catch.

8. The apparatus of claim 1, further comprising:
   at least one tab positioned within the bottom channel that allows the second subset of the plurality of removable storage media to move towards the open first end but not towards the closed second end.

9. The apparatus of claim 1, wherein the gripper includes a robotic transport within an automated removable storage media library.

10. The apparatus of claim 1, wherein the plurality of removable storage media include magnetic tape cartridges.

11. A method comprising:
    receiving and retaining a plurality of removable storage media within a housing, the housing including an open first end, an opposed, closed second end, a top channel that is configured to receive and retain a first subset of the plurality of removable storage media, and a bottom channel that is configured to receive and retain a second subset of the plurality of removable storage media, the top channel and the bottom channel being shaped to receive and retain the plurality of removable storage media in respective single-file rows via the open first end;
    positioning a shuffler at least partially within the housing, the shuffler including a catch and a rake that is coupled to the catch, wherein when the shuffler is in a resting position, the catch is located near the open first end and the rake is positioned near the closed second end;
    gripping the catch of the shuffler with a gripper;
    pulling the catch outward away from the open first end with the gripper such that the rake moves the second subset of the plurality of removable storage media towards the open first end; and
    releasing the catch from the gripper so that the shuffler returns to the resting position upon the catch being released.

12. The method of claim 11, wherein receiving includes the housing further including a separator that inhibits the first subset of the plurality of removable storage media from falling onto the second subset of the plurality of removable storage media.

13. The method of claim 12, wherein receiving includes a gap in the separator at the closed second end of the housing being large enough to allow a first removable storage medium of the first subset of the plurality of removable storage media to fall into the bottom channel.

14. The method of claim 13, wherein receiving includes a retaining catch being located in the gap, wherein pulling includes when the shuffler has been moved away from the resting position, the retaining catch holds the first removable storage medium in the top channel, and wherein releasing includes, when the shuffler returns to the resting position, the retaining catch is released to allow the first removable storage medium to fall into the bottom channel.

15. The method of claim 13, further comprising:
    inserting a second removable storage medium into the top channel for inclusion in the first subset of the plurality of removable storage media, wherein the second removable storage medium pushes other items removable storage media in the first subset of the plurality of removable storage media towards the closed second end, and wherein the first removable storage medium falls into the bottom channel upon clearing the gap.

16. The method of claim 11, wherein releasing includes a spring attached to the shuffler and the housing providing force to return the shuffler to the resting position upon the catch being released.

17. The method of claim 11, wherein when the shuffler is in the resting position, the method further comprises:
gripping a first removable storage medium of the second subset of the plurality of removable storage media with the gripper, the catch being positioned relative to the first removable storage medium such that, when the first removable storage medium is gripped by the gripper, the catch is also gripped by the gripper.

18. The method of claim 11, wherein receiving includes the housing including at least one tab positioned within the bottom channel that allows the second subset of the plurality of removable storage media to move towards the open first end but not towards the closed second end.

19. The method of claim 11, wherein gripping, pulling, and releasing include the gripper including a robotic transport within an automated removable storage media library.

20. The method of claim 11, wherein the plurality of removable storage media include magnetic tape cartridges.

\* \* \* \* \*